(12) United States Patent
Brookins

(10) Patent No.: US 11,009,143 B1
(45) Date of Patent: May 18, 2021

(54) EXPANDABLE SOLENOID SYSTEM

(71) Applicant: Keith Donald Brookins, Miami, FL (US)

(72) Inventor: Keith Donald Brookins, Miami, FL (US)

(73) Assignee: ZAP MOSQUITO SOLUTIONS INC., Miami, FL (US)

(*) Notice: Subject to any disclaimer, the term of this patent is extended or adjusted under 35 U.S.C. 154(b) by 0 days.

(21) Appl. No.: 17/130,234

(22) Filed: Dec. 22, 2020

(51) Int. Cl.
| | |
|---|---|
| *F16K 27/02* | (2006.01) |
| *F16K 31/06* | (2006.01) |
| *F16K 11/24* | (2006.01) |
| *F16K 27/00* | (2006.01) |
| *F16K 11/22* | (2006.01) |
| *F15B 13/08* | (2006.01) |

(52) U.S. Cl.
CPC .......... *F16K 31/06* (2013.01); *F15B 13/085* (2013.01); *F15B 13/0817* (2013.01); *F15B 13/0821* (2013.01); *F15B 13/0832* (2013.01); *F15B 13/0835* (2013.01); *F15B 13/0853* (2013.01); *F15B 13/0857* (2013.01); *F15B 13/0889* (2013.01); *F16K 11/22* (2013.01); *F16K 11/24* (2013.01); *F16K 27/003* (2013.01); *F16K 27/029* (2013.01); *Y10T 137/5987* (2015.04); *Y10T 137/87877* (2015.04); *Y10T 137/87885* (2015.04)

(58) Field of Classification Search
CPC ........ F16K 11/22; F16K 11/24; F16K 27/003; F16K 27/029; F16K 31/06; Y10T 137/5987; Y10T 137/87877; Y10T 137/87885; F15B 13/0817; F15B 13/0821; F15B 13/0832; F15B 13/0835; F15B 13/085; F15B 13/0853; F15B 13/0857; F15B 13/0889
See application file for complete search history.

(56) References Cited

U.S. PATENT DOCUMENTS

| | | | | |
|---|---|---|---|---|
| 2,879,788 | A | * | 3/1959 | Beckett .................. F16K 27/041 137/454.6 |
| 3,111,139 | A | * | 11/1963 | Beckett ............... F15B 13/0857 137/884 |
| 3,509,904 | A | * | 5/1970 | Olson .................. F15B 13/0896 137/269 |
| 3,915,194 | A | * | 10/1975 | Friedrich ............ F15B 13/0817 137/884 |
| 4,830,054 | A | | 5/1989 | Feichtiger et al. |
| 4,938,258 | A | | 7/1990 | Sato |

(Continued)

*Primary Examiner* — Matthew W Jellett
(74) *Attorney, Agent, or Firm* — Albert Bordas, P.A.

(57) ABSTRACT

An expandable solenoid system having a sequence controller assembly and at least two zone expander solenoid valve assemblies fastened in a staggered configuration. Each zone expander solenoid valve assembly has a zone expander solenoid and a flanged valve body assembly. The valve block has threaded bolt holes, unthreaded bolt holes, an output port, and a threaded pressure source port having an O-ring groove. The threaded bolt holes and the unthreaded bolt holes have different depths and are alternately positioned around a perimeter of the valve block. The first flanged valve body assembly is fastened to the second flanged valve body assembly and so on, in a staggered configuration, whereby respective zone expander solenoids are in a zigzag geometry and creating an expandable manifold.

18 Claims, 8 Drawing Sheets

(56) References Cited

U.S. PATENT DOCUMENTS

| | | | |
|---|---|---|---|
| 6,173,745 B1* | 1/2001 | Hayashi | F16K 27/003 |
| | | | 137/884 |
| 6,206,045 B1 | 3/2001 | Hayashi et al. | |
| 6,302,149 B1 | 10/2001 | Sato et al. | |
| 6,696,805 B2 | 2/2004 | Tanner et al. | |
| 6,786,049 B2 | 9/2004 | Parsons et al. | |
| 6,834,661 B2 | 12/2004 | Bento | |
| 6,853,530 B1 | 2/2005 | Radusewicz et al. | |
| 6,874,537 B2 | 4/2005 | Hayashi et al. | |
| 7,010,396 B2 | 3/2006 | Ware et al. | |
| 7,084,741 B2 | 8/2006 | Plummer | |
| 7,464,726 B2* | 12/2008 | Mertes | F15B 13/0817 |
| | | | 137/884 |
| 8,267,375 B1* | 9/2012 | LaHousse | F16K 27/029 |
| | | | 251/129.15 |
| 8,322,367 B2* | 12/2012 | Harris | F16K 27/003 |
| | | | 137/597 |
| 8,434,523 B2 | 5/2013 | Suharno | |
| 8,807,167 B2* | 8/2014 | Song | E03C 1/057 |
| | | | 137/607 |
| 8,840,084 B2* | 9/2014 | Crist | G05D 7/0623 |
| | | | 251/129.04 |
| 8,851,447 B2* | 10/2014 | Crist | A01G 25/16 |
| | | | 251/129.04 |
| 10,001,786 B2 | 6/2018 | Hutchins et al. | |
| 10,496,109 B2 | 12/2019 | Hutchins et al. | |
| 10,555,432 B2 | 2/2020 | Carolis et al. | |
| 2014/0001385 A1* | 1/2014 | Scott | F16K 31/0679 |
| | | | 251/129.15 |
| 2014/0263690 A1* | 9/2014 | Eckman | B05B 15/68 |
| | | | 239/1 |

* cited by examiner

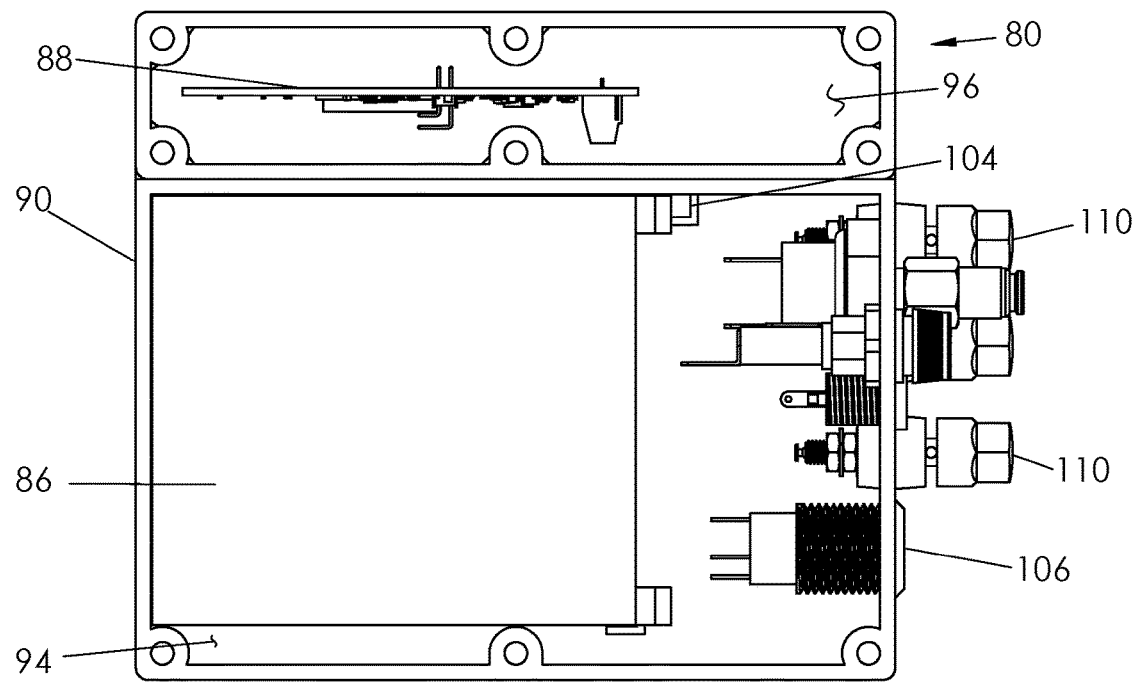
Fig. 7A
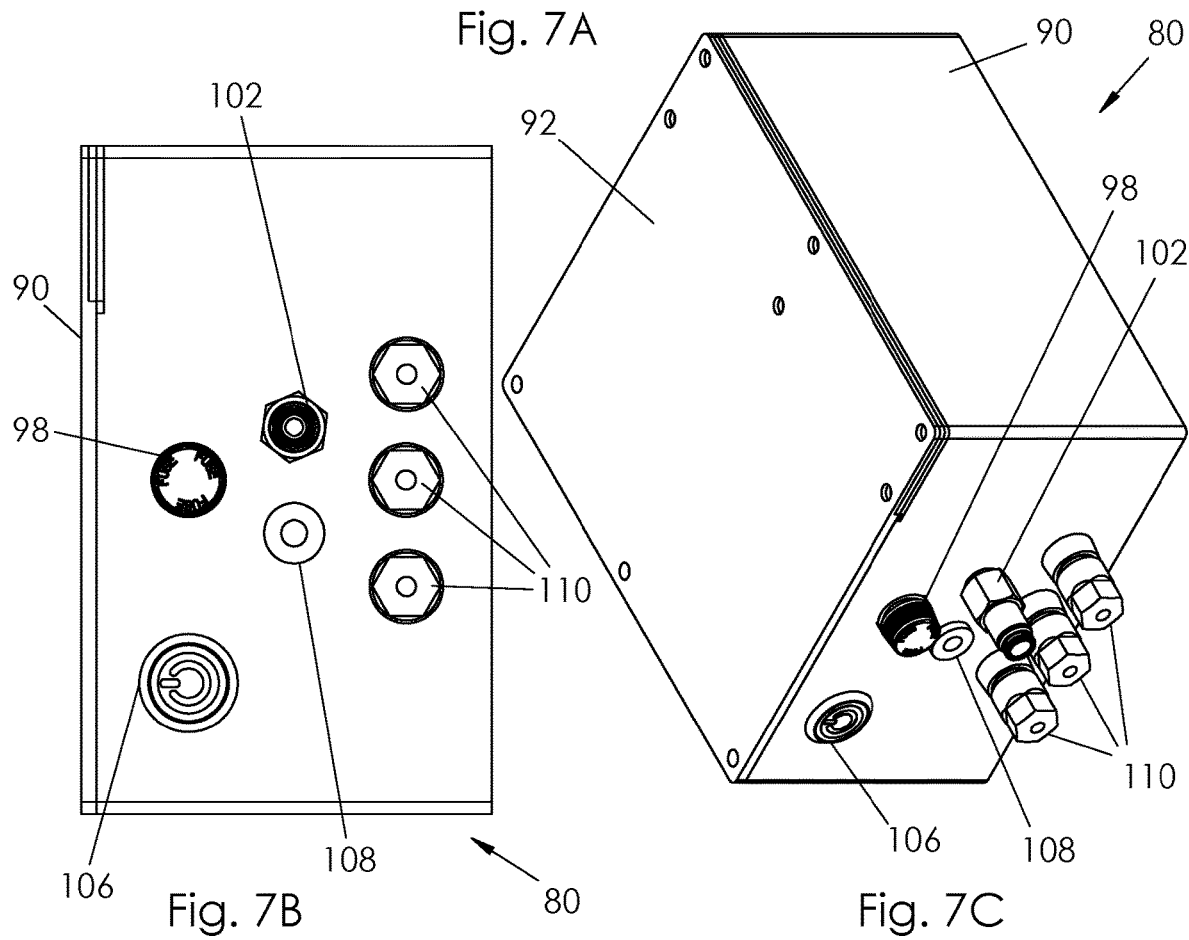
Fig. 7B
Fig. 7C

EXPANDABLE SOLENOID SYSTEM

BACKGROUND OF THE INVENTION

1. Field of the Invention

The present invention relates to solenoid systems, and more particularly, to expandable solenoid valve systems.

2. Description of the Related Art

Applicant believes that one of the closest references corresponds to U.S. Pat. No. 4,830,054 A issued to Feichtiger, et al. on May 16, 1989 for Component assembly of several directional control valves adapted to be shifted electromagnetically independently of one another. However, it differs from the present invention because Feichtiger, et al. teach a component group of electromagnetically shiftable directional control valves, which can be installed in a simple manner that include 2/2- and 3/2-directional control valves preassembled on an electrical printed circuit board and secured in common with the printed circuit board by plugging-in the directional control valves into plug-in receptacles of a base element and by fastening a cover at the base element in the housing formed by the base element and the cover; a pneumatic main channel extends between the base element and the cover, which is in fluidic communication with several directional control valves and which is tightly closed off by fastening the cover at the base element.

Applicant believes that another reference corresponds to U.S. Pat. No. 4,938,258 A issued to Sato on Jul. 3, 1990 for Power supply system for solenoid valves. However, it differs from the present invention because Sato teaches a power-supply system for solenoid valves having one or more brackets attached to a manifold base, the brackets support a printed wiring board carrying a printed power-supply circuit and power-supply terminals, the use of one or more brackets permit using the same common manifold base with or without the printed-wiring board. Each bracket has a longitudinal opening into which the power-supply terminal is snugly fitted and is attached to one side of the manifold base. A multipolar connector on the printed-wiring board is connected to the power-supply terminals by a power-supply circuit printed on the printed-wiring board. The multipolar connector connects to a power source. When the printed-wiring board is inserted into the brackets, the power-supply terminals stick out from the longitudinal opening in the brackets.

Applicant believes that another reference corresponds to U.S. Pat. No. 6,206,045 B1 issued to Hayashi, et al. on Mar. 27, 2001 for Manifold solenoid valve driven by serial signals. However, it differs from the present invention because Hayashi, et al. teach a manifold solenoid valve drive-controlled by serial signals that permit assembly and maintenance, and eliminates a possibility of erroneous wiring. For this purpose, compressed air is supplied and exhausted through manifold blocks on which solenoid valves are mounted and which are consecutively connected, and serial signals are transmitted to the respective solenoid valves. A fluid passage section of the manifold block is provided with common passages for air supply and exhaust that penetrate the respective manifold blocks, and channels that communicate them with supply/discharge openings of the solenoid valves. In an electric circuit section of the manifold block, a printed circuit board, which has connecting terminals for transmitting serial signals, slave chips for extracting operation signals for the solenoid valves from serial signals, and a feeder terminal for supplying power to the solenoid valves based on the operation signals, is accommodated. Assembling the manifold solenoid valve completes communication of the passages and electrical connection.

Applicant believes that another reference corresponds to U.S. Pat. No. 6,302,149 B1 issued to Sato, et al. on Oct. 16, 2001 for Solenoid-valve manifold with feeding mechanism. However, it differs from the present invention because Sato, et al. teach a solenoid-valve manifold having a feeding mechanism in which a connector for connecting to a power supply and each solenoid valve can be easily connected together and a connection structure can be easily changed in accordance with an increase or decrease in the number of the solenoid valves. For this purpose, a plurality of manifold blocks having two upper and lower fixing grooves at front and rear surfaces thereof are detachably connected together, and a connector holder is fixed to the fixing grooves in such a manner that the fixing position can be freely adjusted. Further, a multipolar connector for connecting to an external power source is attached to the connector holder, a connector base plate having a plurality of distributing connector corresponding to each of the solenoid valves is also attached to the connector holder, and the distribution connectors are each connected to a power-receiving connector of the solenoid valve with a splicer.

Applicant believes that another reference corresponds to U.S. Pat. No. 10,001,786 B2 issued to Hutchins, et al. on Jun. 19, 2018 for Solenoid manifold device, controller and method of controlling a solenoid manifold. However, it differs from the present invention because Hutchins, et al. teach a controller for controlling at least one solenoid that comprises a first electrical connector for electrically communicating with a vehicle communications bus; a second electrical connector for transmitting messages to a plurality of solenoids; and a processor having control logic. The control logic is capable of associating each of a plurality of solenoids with a vehicle function when the plurality of solenoids are in electrical communication with the controller; receiving a control message at the first electrical connector in a first format to enable a first vehicle function; and electrically communicating a control message in a second format at the second electrical connector in response to receiving the control message in the first format to control one of the plurality of solenoids associated with the first vehicle function.

Applicant believes that another reference corresponds to U.S. Pat. No. 10,496,109 B2 issued to Hutchins, et al. on Dec. 3, 2019 for Solenoid manifold device, controller and method of controlling a solenoid manifold. However, it differs from the present invention because Hutchins, et al. teach a controller for controlling at least one solenoid that comprise a first electrical connector for electrically communicating with a vehicle communications bus; a second electrical connector for transmitting messages to a plurality of solenoids; and a processor having control logic. The control logic is capable of associating each of a plurality of solenoids with a vehicle function when the plurality of solenoids are in electrical communication with the controller; receiving a control message at the first electrical connector in a first format to enable a first vehicle function; and electrically communicating a control message in a second format at the second electrical connector in response to receiving the control message in the first format to control one of the plurality of solenoids associated with the first vehicle function.

Applicant believes that another reference corresponds to U.S. Pat. No. 10,555,432 B2 issued to Carolis, et al. on Feb. 4, 2020 for Valve manifold serially mounted to a distributed control system assembly. However, it differs from the present invention because Carolis, et al. teach a control system that has an I/O bank with a communication module controlling a plurality of Input/Output modules operably connected to its communication backplane and a valve manifold having a communication module serially connected to the backplane of the I/O bank. The I/O bank with a plurality of Input/Output modules is constructed to be connected to a plurality of field sensors or loads. The valve manifold with a plurality of solenoid valves is constructed to be pneumatically connected to a plurality of field devices.

Applicant believes that another reference corresponds to U.S. Pat. No. 6,696,805 B2 issued to Tanner, et al. on Feb. 24, 2004 for Software-driven motor and solenoid controller. However, it differs from the present invention because Tanner, et al. teach an apparatus and method for controlling electrical devices such as electric trains using a computer. Standard ports that appear on most computers are used, and work with standard well-known widely commercially available train sets. Customized software and circuitry for managing the speed and direction of one or more motors, and also for controlling the configuration of track turnouts are disclosed.

Applicant believes that another reference corresponds to U.S. Pat. No. 6,786,049 B2 issued to Parsons, et al. on Sep. 7, 2004 for Fuel supply control for a gas turbine including multiple solenoid valves. However, it differs from the present invention because Parsons, et al. teach a fuel supply control system for a gas turbine that includes a plurality of solenoid valves. The solenoid valves are energized in a timing sequence with a phase relationship designed to achieve a desired fuel flow. In one example, one solenoid valve is associated with a primary portion of a fuel manifold while at least two other solenoids are associated with a secondary portion of the manifold. A controller that energizes the solenoids to achieve the desired fuel flow can receive feedback information regarding turbine performance to make adjustments to the solenoid operation to bring the turbine performance closer to a desired level.

Applicant believes that another reference corresponds to U.S. Pat. No. 6,834,661 B2 issued to Bento on Dec. 28, 2004 for Dual mode solenoid valve with pressure regulation. However, it differs from the present invention because Bento teaches a control valve system that includes a housing having an inlet port, a first output port, a second output port, and a valve chamber. A primary spool and a secondary spool are independently slidable in the valve chamber. The secondary spool has a first end for abutting against the primary spool and has a second end with a working surface area greater than the working surface areas at the ends of the primary spool. A solenoid valve assembly controllably connects the inlet port to the second end of the secondary spool. A biaser provides a biasing force to the primary spool. A first fluid passage through the primary spool provides fluid communication between the first output port and a second end of the primary spool for displacing the primary spool relative to the secondary spool in an energy saving mode, thereby regulating a pressure at the first output relative to the predetermined magnitude of the biasing force.

Applicant believes that another reference corresponds to U.S. Pat. No. 6,853,530 B2 issued to Radusewicz, et al. on Feb. 8, 2005 for Apparatus and method for actuating a mechanical device. However, it differs from the present invention because Radusewicz, et al. teach an integrated module encased in protective housing that is electrically and mechanically connected to a solenoid, which remotely actuates an Automatic Transfer Switch (ATS) or lighting contactor. The module includes a full-wave bridge rectifier, voltage transient voltage protection-circuitry, a proximity detector to determine the solenoid's plunger position, and a mounting strap to attach the solenoid to a frame. In addition, the module accepts various resistor values as plug-in devices to reduce a line voltage and incorporates a communication device/modem for connection to the Internet. The module allows a fixed voltage across the solenoid coil, and permits the solenoid to be connected to various operating voltages.

Applicant believes that another reference corresponds to U.S. Pat. No. 6,874,537 B2 issued to Hayashi, et al. on Apr. 5, 2005 for Manifold valve. However, it differs from the present invention because Hayashi, et al. teach a plurality of pipe joints mounted to a lower face of a base portion of a manifold base. A plurality of solenoid valves are respectively mounted to two valve mounting faces of a valve mounting portion provided onto the base portion. Respective ports of the solenoid valves and the respective pipe joints communicate with each other through flow paths in the manifold base. A substrate assembly for feeding the respective solenoid valves is supported on a substrate mounting portion provided onto the valve mounting portion.

Applicant believes that another reference corresponds to U.S. Pat. No. 7,010,396 B2 issued to Ware, et al. on Mar. 7, 2006 for Irrigation controller with embedded web server. However, it differs from the present invention because Ware, et al. teach an irrigation controller with an embedded web server that activates irrigation devices in accordance with an event schedule. The event schedule maybe accessed and modified via a browser-equipped client. In certain embodiments, watering rates and schedules are adjusted in response to sensor inputs. The controller may query specialized network servers such as time servers or weather servers to update the controller clock and/or modify the event schedule. The controller may support multiple protocols such as email, FTP, UDP, HTTP and the like. The controller may be configured as a master or slave controller such that multiple slave controllers may coordinate with a master controller and modify their event schedules in accordance with the master event schedule. The result is an irrigation controller that is easily configured, locally or remotely accessible, responsive to varying weather conditions, and suitable for complex multi zone, multisystem configurations.

Applicant believes that another reference corresponds to U.S. Pat. No. 7,084,741 B2 issued to Plummer on Aug. 1, 2006 for Method for communication between a first station and a second station, and a controller and remote station using the communication method. However, it differs from the present invention because Plummer teaches a method for communicating between a first station and a second station over a wire pair, in which the first station sends an alternating power signal over the wire pair, the alternating power signal comprising a plurality of communication symbols, the second station receiving the alternating power signal and determining therefrom the communication symbols, the second station drawing current from the alternating power signal in a sequence corresponding to at least one further communication symbol, and the first station determining the current drawn in the alternating power signal to recover the further communication symbol.

Applicant believes that another reference corresponds to U.S. Pat. No. 8,434,523 B2 issued to Suharno on May 7, 2013 for Modular upgradeable pneumatic/hydraulic manifold. However, it differs from the present invention because Suharno teaches an upgradeable A/C maintenance system and methodology including one or more modular manifolds for mounting and fluidly connecting several components. Embodiments include first and second manifolds, each for removably mounting a plurality of components, and each comprising an internal passage for fluidly connecting at least two of the plurality of components to each other, and a port for fluidly connecting the internal passage to an external surface of the first manifold. The first and second manifolds are removably attachable to each other such that their respective ports fluidly communicate with each other. The first manifold provides a first functionality for the system when the second manifold is not attached to the first manifold, and the second manifold provides a second functionality different from the first functionality when the second manifold is attached to the first manifold.

Other patents describing the closest subject matter provide for a number of more or less complicated features that fail to solve the problem in an efficient and economical way. None of these patents suggest the novel features of the present invention.

SUMMARY OF THE INVENTION

The present invention is an expandable solenoid system, comprising a sequence controller assembly and at least two zone expander solenoid valve assemblies fastened in a staggered configuration, wherein each zone expander solenoid valve assembly comprises a zone expander solenoid and a flanged valve body assembly.

The zone expander solenoid comprises a housing having a top wall, a base, and a solenoid wire cover. The housing houses a plunger, winding coils, and a serial data and solenoid controller. From the top wall extends power connections, serial data connections, and a retainer nut. From the base extends a joining port.

The flanged valve body assembly comprises a valve block with a threaded block neck. The flanged valve body assembly further comprises an output adapter, O-rings, and flange bolts. The valve block comprises threaded bolt holes, unthreaded bolt holes, an output port, and a threaded pressure source port having an O-ring groove. The threaded block neck comprises internal threads, a pressure port conduit, and a valve seat. The threaded bolt holes and the unthreaded bolt holes are alternately positioned. The threaded bolt holes and the unthreaded bolt holes are alternately positioned around the perimeter of the valve block and the threaded pressure source port and the output port are both at different distances from a center plane. A first flanged valve body assembly is joined to a second flanged valve body assembly, whereby a first threaded pressure source port is joined to a second threaded pressure source port, which are sealed via one of the O-rings, whereby the O-ring groove receives the O-ring. The first threaded pressure source port receives an input adapter and the last of the threaded pressure source port receives a threaded end plug. The threaded block neck receives the joining port and is sealed with an O-ring, not shown. The valve block comprises a conduit and an output conduit from the output port to the threaded block neck. The zone expander solenoid valve assembly further comprises a pressure input source, a tee sample connector, a pressure sampling tube, and a pressure source tube.

The sequence controller assembly comprises a controller housing having a battery cavity, a controller cavity, a lid, and a plurality of holes. The sequence controller assembly further comprises a battery, a controller printed circuit board, and a controller cavity seal. The sequence controller assembly further comprises a fuse with a fuse holder, a pressure switch, an input adapter, a potting cavity, an on/off switch, a charge port, power and data connections, electrical wirings, and parallel power connections. The pressure sampling tube is connected from the input adapter to the tee sample connector, and the tee sample connector connects the pressure input source and the pressure source tube. The first flanged valve body assembly is fastened to the second flanged valve body assembly and so on, in a staggered configuration, whereby respective zone expander solenoids are in a zigzag geometry. The first flanged valve body assembly is fastened to the second flanged valve body assembly and so on, in a staggered configuration creating an expandable manifold.

It is therefore one of the main objects of the present invention to provide an expandable solenoid system.

It is another object of this invention to provide an expandable solenoid system having at least two zone expander solenoid valve assemblies assembled in a staggered configuration.

It is another object of this invention to provide an expandable solenoid system that multiplies a high-pressure system's ability by the number of zone expander solenoid valve assemblies added, at a fraction of the cost of adding an additional pressure system.

It is another object of this invention to provide an expandable solenoid system that automatically discover and count, and sequence its zone expander solenoids upon every startup.

It is another object of this invention to provide an expandable solenoid system in which additional zone expander solenoid valve assemblies are easily added or removed anytime.

It is another object of this invention to provide an expandable solenoid system that automatically detect and count, and sequence for added or removed zone expander solenoid valve assemblies upon startup.

It is another object of this invention to provide an expandable solenoid system that has zone expander solenoids, which are discoverable, addressable, and controllable.

It is another object of this invention to provide an expandable solenoid system in which flanged valve body assemblies allows for a closest possible proximity between zone expander solenoids with staggered fastening in a zigzag geometry, reducing zone expander solenoids thickness, which in-turn reduces weight, build costs, and reduces power and data wire runs.

It is another object of this invention to provide an expandable solenoid system in which by the combined synergy of zone expander solenoids in a stackable flange configuration, creating a manifold of various lengths and zone quantities.

It is another object of this invention to provide an expandable solenoid system in which flanged valve body assemblies utilize alternating short and long bolt passages to assure closer nesting and fastening stagger, while providing a clearance for bolt heads.

It is another object of this invention to provide an expandable solenoid system in which flanged valve body assemblies utilizes alternating threaded and unthreaded bolt passages to assure proper offset alignments and continuing add-on fastening abilities.

It is another object of this invention to provide an expandable solenoid system in which flanged valve body assemblies reduce costs through reduced material requirements and ability to manufacture by molding such as injection molding.

It is another object of this invention to provide an expandable solenoid system that can be configured to alternate zones.

It is another object of this invention to provide an expandable solenoid system that can be configured to short cycle zones several times.

It is another object of this invention to provide an expandable solenoid system in which combining a solenoid valve with a staggered flange body is more reliable than otherwise individual structures being combined.

It is another object of this invention to provide an expandable solenoid system that is volumetrically efficient for carrying, transporting, shipping, and storage.

It is another object of this invention to provide an expandable solenoid system that can be readily assembled and disassembled without the need of any special tools.

It is another object of this invention to provide an expandable solenoid system, which is of a durable and reliable construction.

It is yet another object of this invention to provide an expandable solenoid system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 7A is an open top view of the sequence controller assembly.

FIG. 7B is a front view of the sequence controller assembly.

FIG. 7C is an isometric view of the sequence controller assembly.

DETAILED DESCRIPTION OF THE PREFERRED EMBODIMENT

Figure 1:
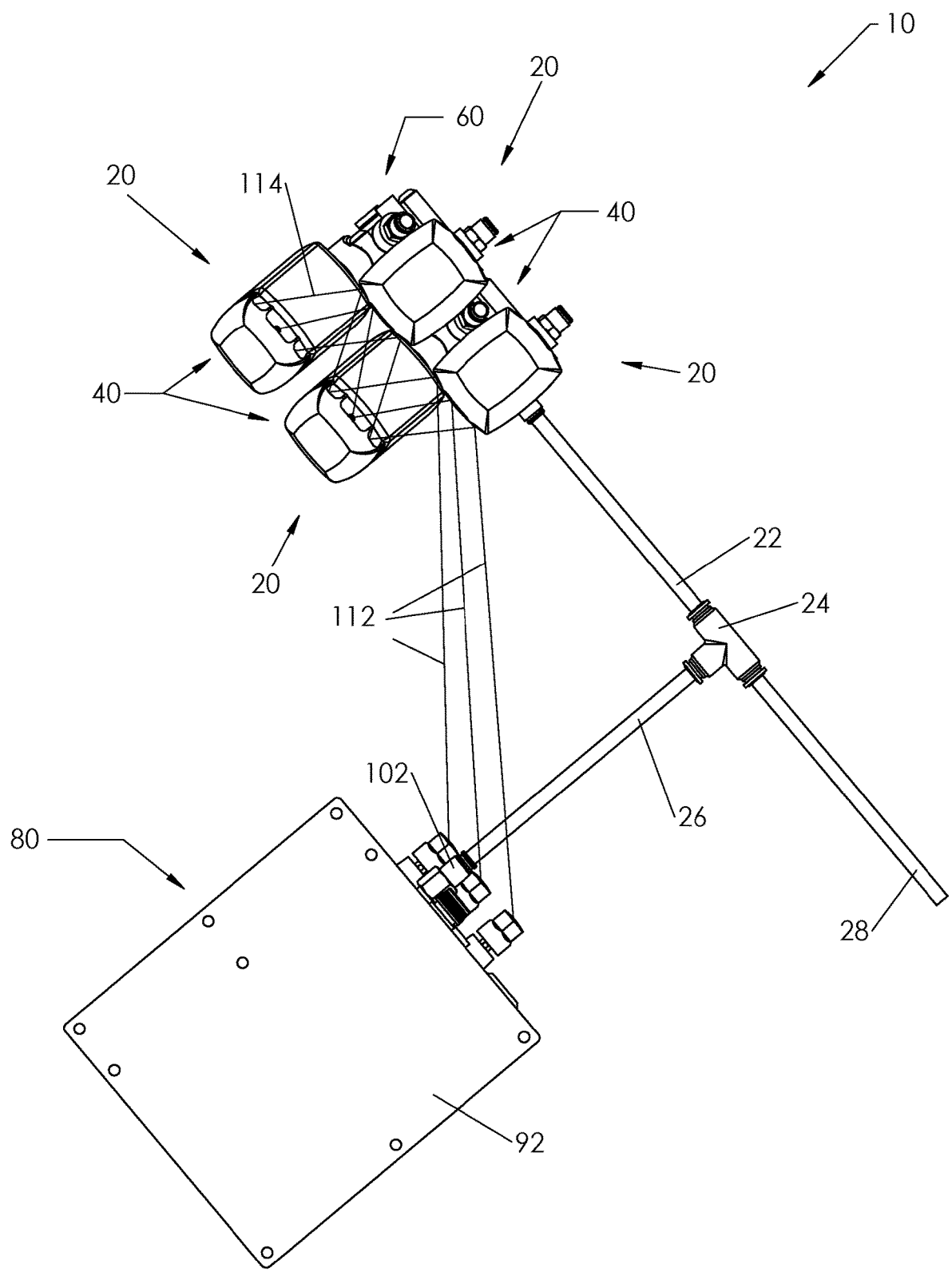
FIG. 1 is a top view of the present invention.

Referring now to the drawings, the present invention is an expandable solenoid system, and is generally referred to with numeral 10. It can be observed that it basically includes at least two zone expander solenoid valve assemblies 20, and sequence controller assembly 80.

Figure 2:
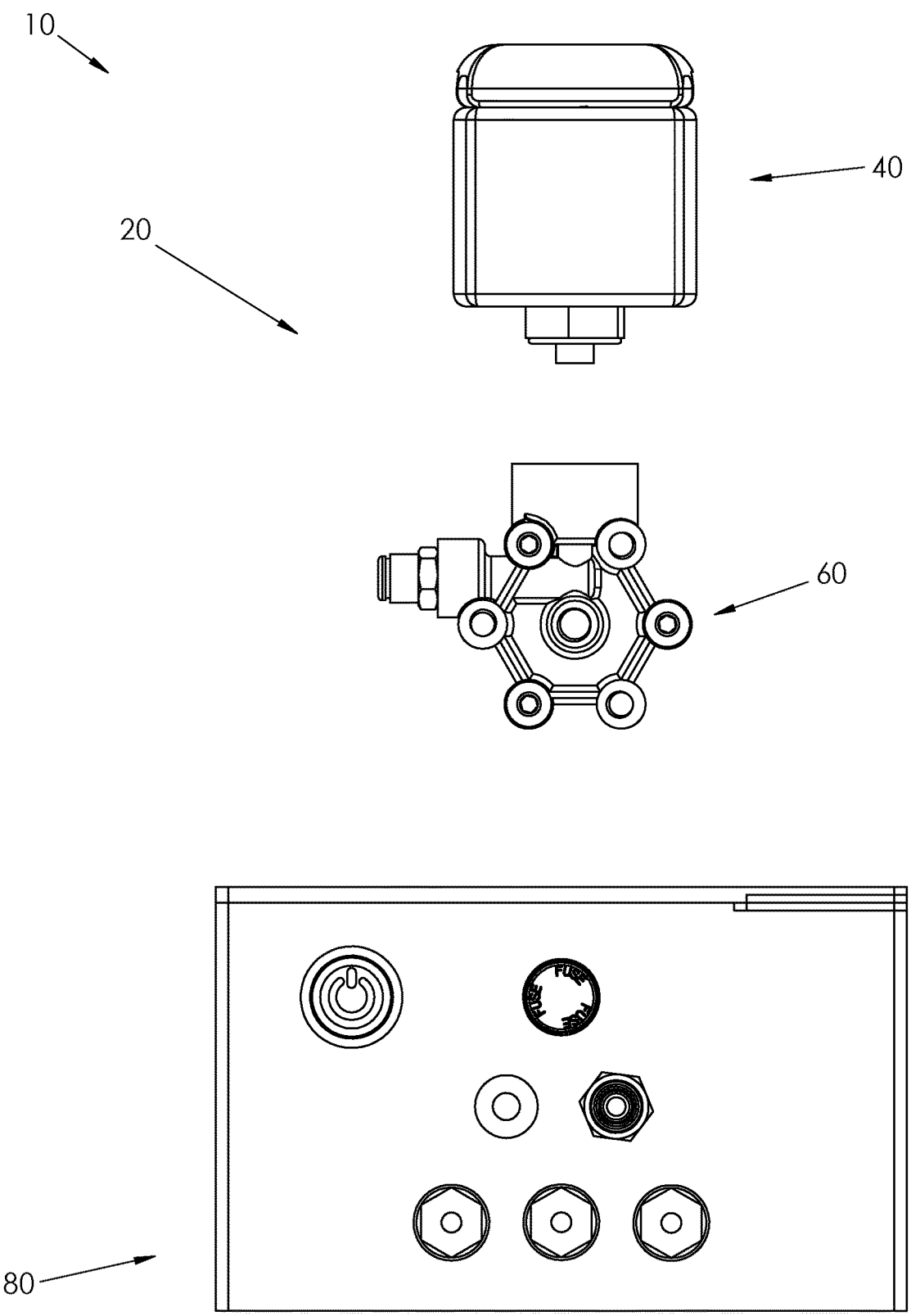
FIG. 2 is a side view of the present invention disassembled.

As seen in FIGS. 1 and 2, two or more zone expander solenoid valve assemblies 20 are assembled in a staggered configuration creating a manifold. Each zone expander solenoid valve assembly 20 comprises zone expander solenoid 40 and flanged valve body assembly 60. Offset stacking of flanged valve body assemblies 60 allow space for zone expander solenoid 40 while joining ports. Proper offset is assured by an arrangement of alternating threaded bolt holes 68 and unthreaded bolt holes 70, seen in FIG. 3. Zone expander solenoid valve assembly 20 further comprises pressure input source 22, tee sample connector 24, pressure sampling tube 26, and a pressure source tube 28. Pressure sampling tube 26 is connected from input adapter 102 to tee sample connector 24. Tee sample connector 24 also connects pressure input source 22 and pressure source tube 28. Pressure input source 22 connects to flanged valve body assembly 60. Electrical wirings 112, and parallel power connections 114 having series data connections, connect sequence controller assembly 80 to zone expander solenoid 40.

Figure 3:
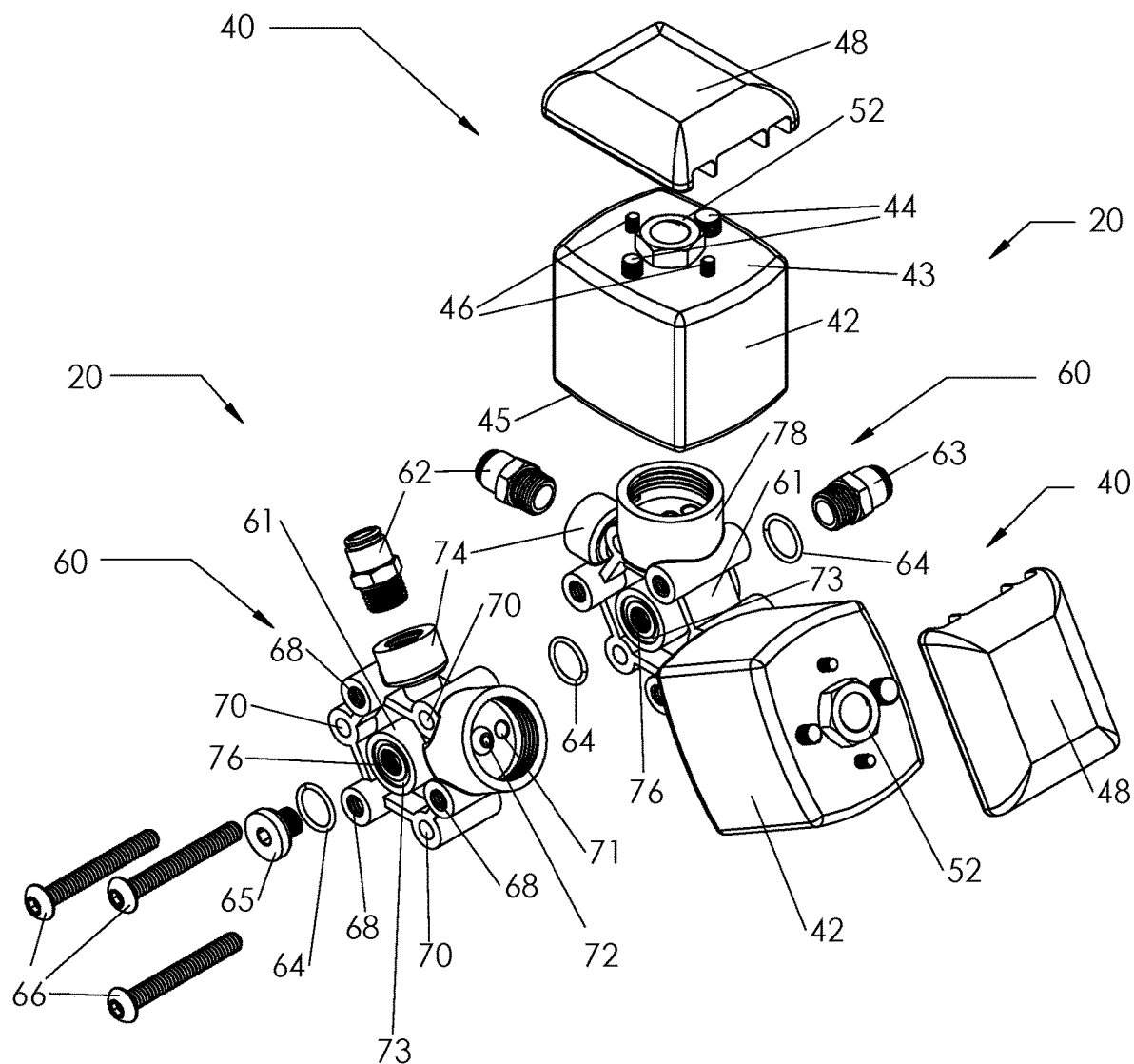
FIG. 3 is an exploded view of two solenoid valve assemblies of the present invention.

As seen in FIG. 3, zone expander solenoid 40 comprises housing 42 having top wall 43, base 45, and solenoid wire cover 48. Protruding from from top wall 43 extends power connections 44, serial data connections 46, and retainer nut 52. Flanged valve body assembly 60 comprises valve block 61 with threaded block neck 78. Flanged valve body assembly 60 further comprises output adapter 62, O-rings 64, and flange bolts 66. Valve block 61 comprises threaded bolt holes 68, unthreaded bolt holes 70, output port 74, and threaded pressure source port 76. Threaded block neck 78 has internal threads. Threaded pressure source port 76 comprises O-ring groove 73. Threaded block neck 78 comprises pressure port conduit 71 and valve seat 72. Threaded bolt holes 68 and unthreaded bolt holes 70 are alternately positioned around a perimeter of valve block 61. Threaded bolt holes 68 and unthreaded bolt holes 70 comprise different depths for required staggering when adding zone expander solenoid valve assembly 20. A first flanged valve body assembly 60 is joined to a second flanged valve body assembly 60, whereby a first threaded pressure source port 76 is joined to a second threaded pressure source port 76, which are sealed via O-ring 64 and constrained by flange bolts 66. O-ring groove 73 receives O-ring 64. O-rings 64 is also used to seal a connection between threaded pressure source port 76 with input adapter 63, and threaded end plug 65. In a preferred embodiment, unthreaded bolt holes 70 faces are lower than a plane of face to accommodate bolt head clearance.

Figures 4A, 4B:
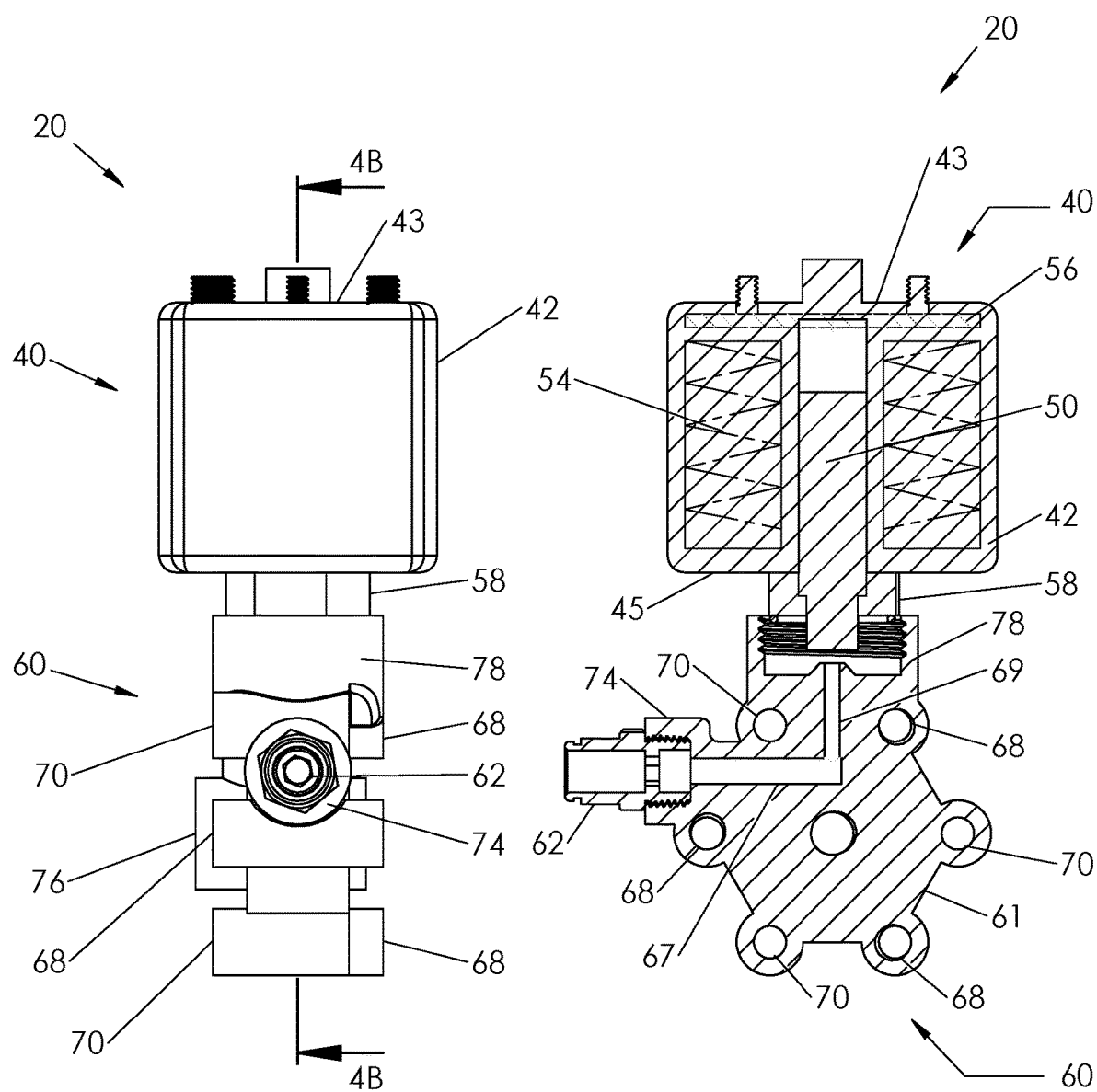
FIG. 4A is a side view of a solenoid valve assembly.
FIG. 4B is a cut view taken along lines 4B-4B from FIG. 4A.
Figures 4C, 4D:
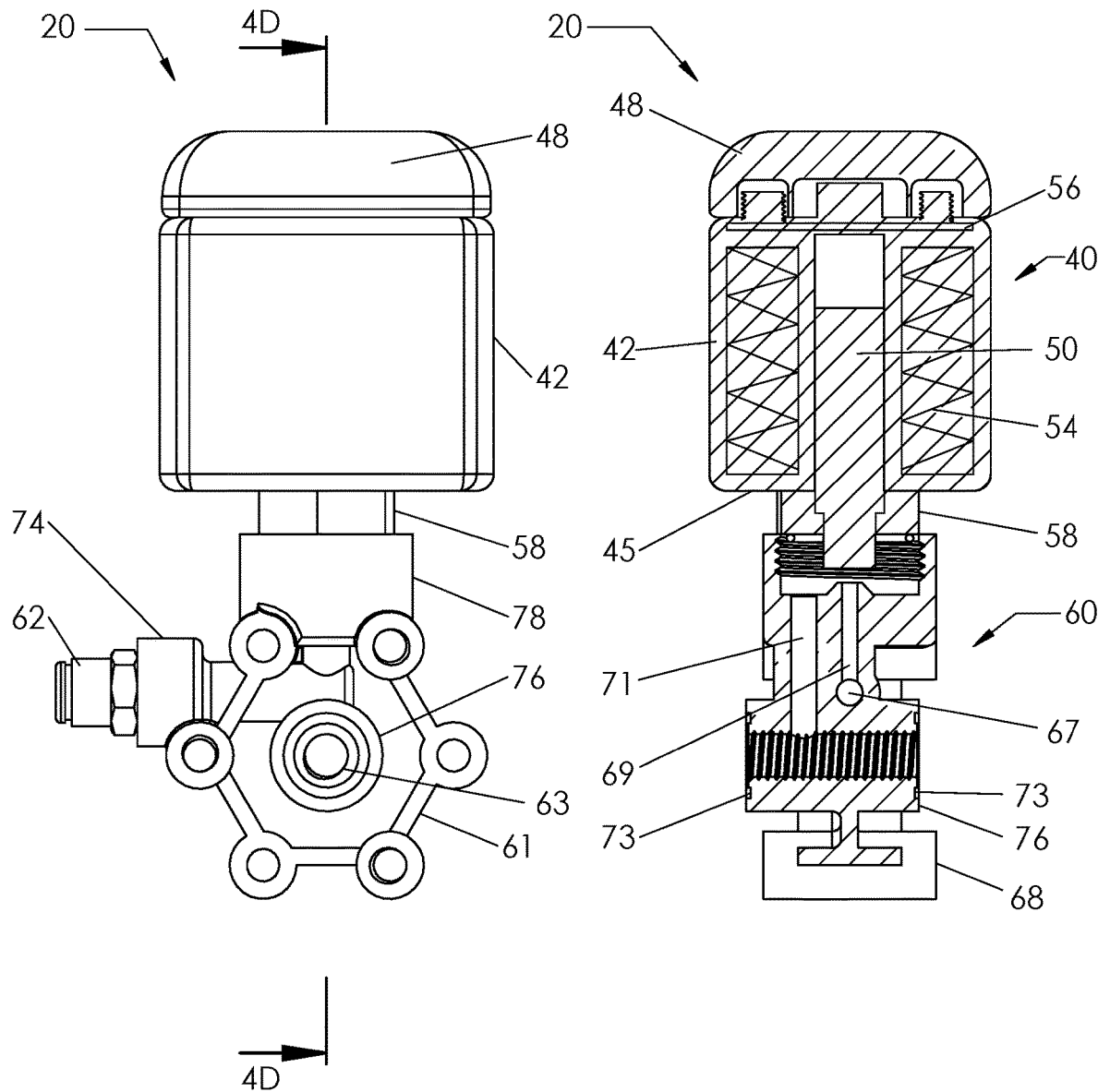
FIG. 4C is a front view of the solenoid valve assembly.
FIG. 4D is a cut view taken along lines 4D-4D from FIG. 4C.
Figures 5A, 5B:
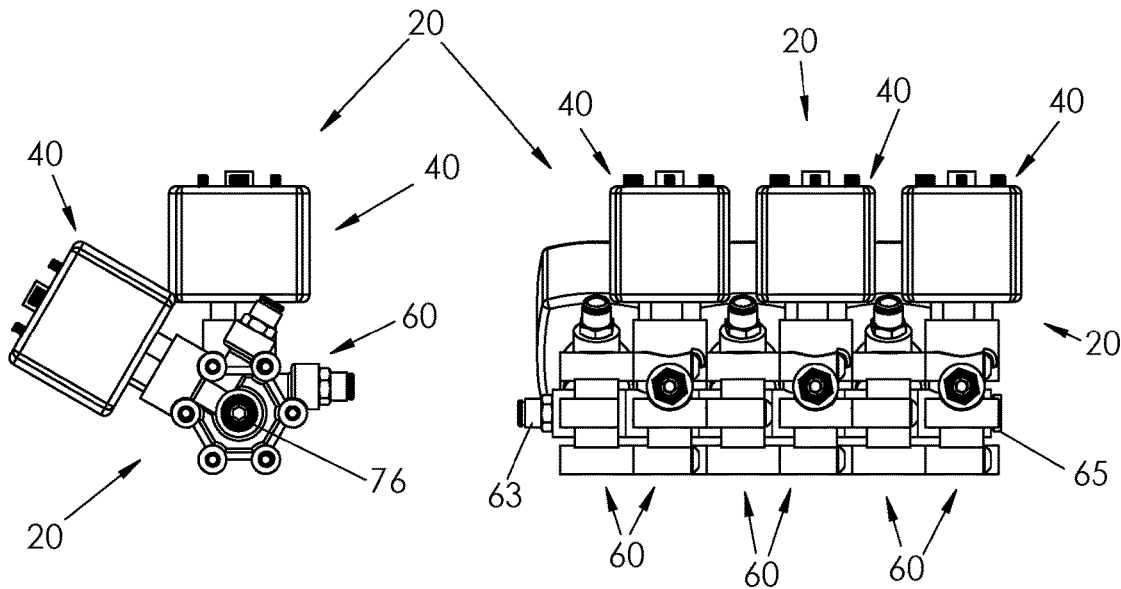
FIG. 5A is a front side view of the solenoid valve assemblies fastened in a staggered configuration creating a manifold.
FIG. 5B is a side view of the solenoid valve assemblies fastened in the staggered configuration creating the manifold.
Figures 5C, 5D:
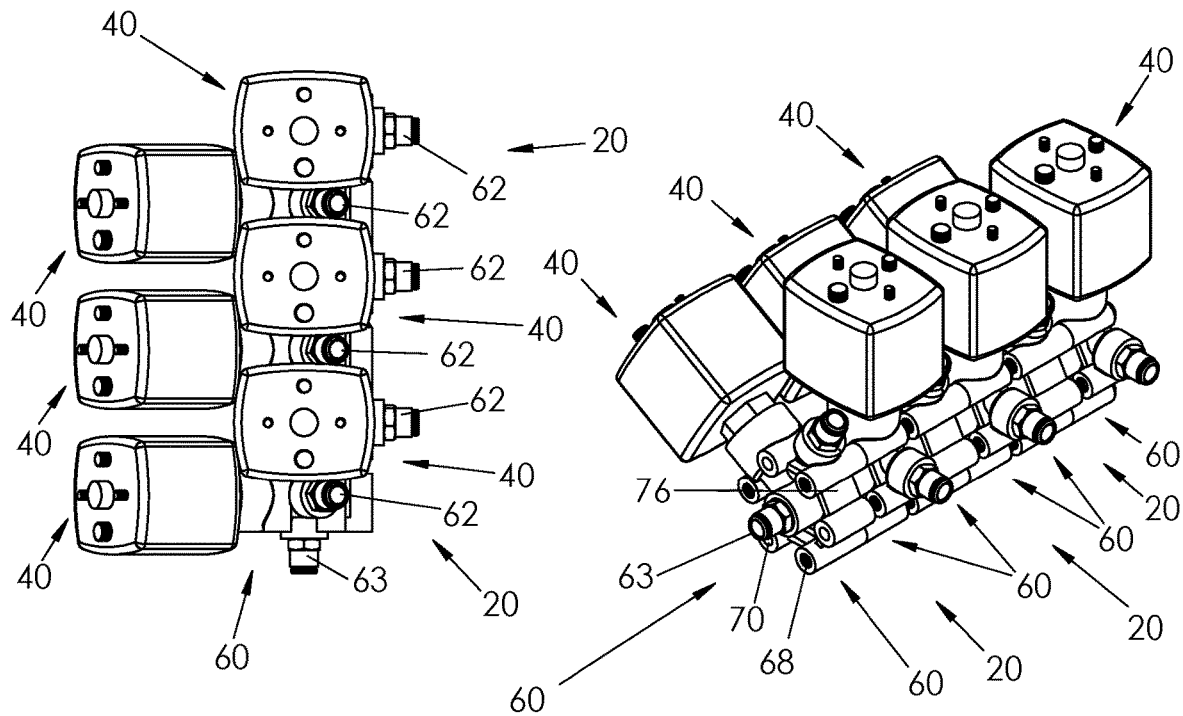
FIG. 5C is a top view of the solenoid valve assemblies fastened in the staggered configuration creating the manifold.
FIG. 5D is an isometric view of the solenoid valve assemblies fastened in the staggered configuration creating the manifold.
Figure 6:
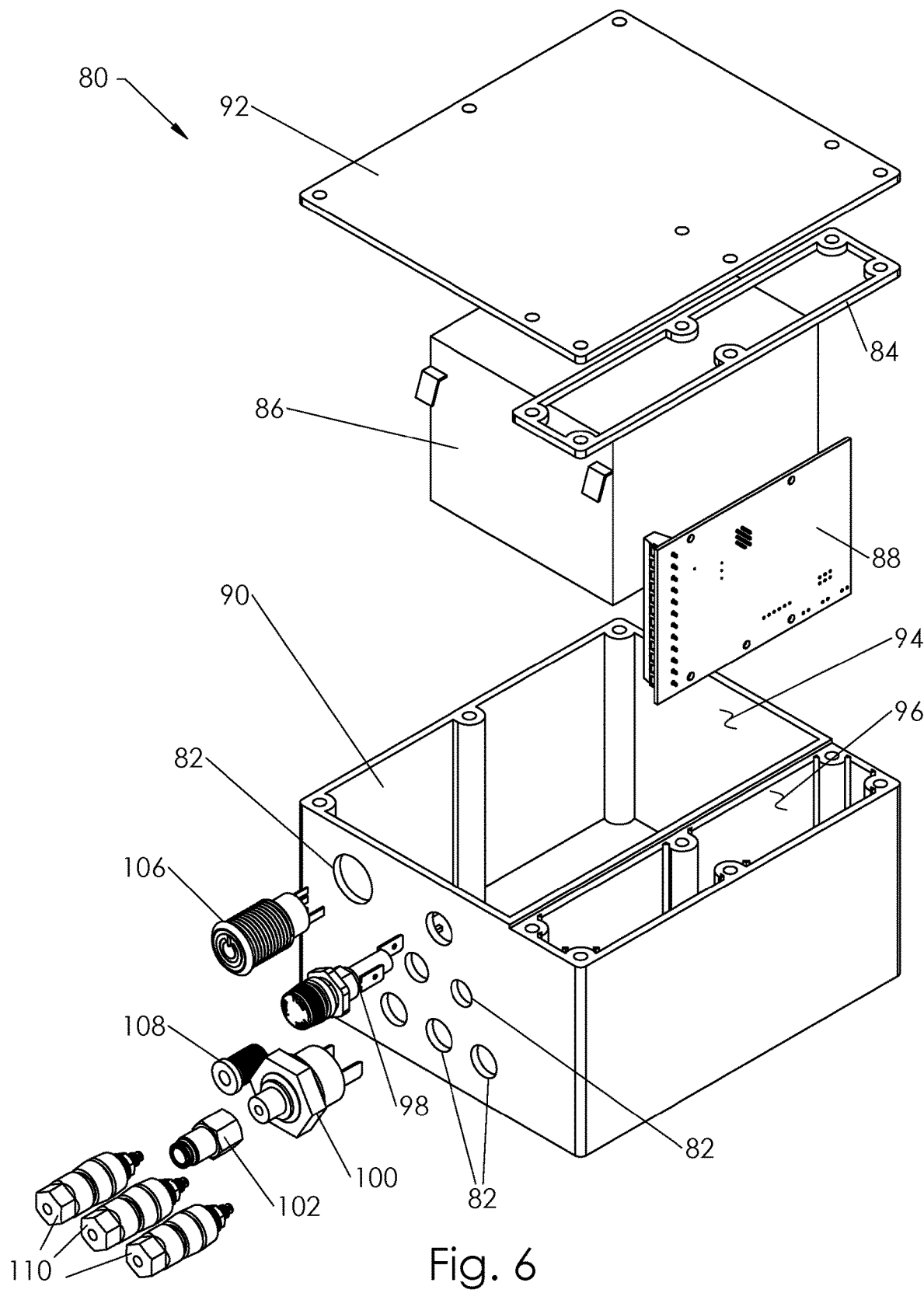
FIG. 6 is an exploded view of a sequence controller assembly.

As seen in FIGS. 4A, 4B, and 4C, housing 42 houses plunger 50, winding coils 54, and serial data and solenoid controller 56. Joining port 58 extends from base 45. Threaded block neck 78 receives joining port 58. Valve block 61 comprises conduit 67 and output conduit 69. Conduit 67 extends from output port 74 to output conduit 69, and output conduit 69 extends from conduit 67 to threaded block neck 78.

As seen in FIGS. 4C and 4D, pressure port conduit 71 extends from threaded block neck 78. Output conduit 69 connects with conduit 67, and pressure port conduit 71 connects with threaded pressure source port 76. Output port 74 and threaded pressure source port 76 are both at different distances from a center plane (offset) providing that: A) zone expander solenoids valve assemblies 20 can't be placed backwards, and B) assures clearance for adaptor threads that they not interfere or restrict pressure port conduit 71.

As seen in FIGS. 5A, 5B, 5C, and 5D, a first flanged valve body assembly 60 is joined to a second flanged valve body assembly 60 and so on, in a staggered configuration, whereby zone expander solenoids 40 are in a closest proximity with a staggered fastening in a zigzag geometry. Staggered and fastened flanged valve body assemblies 60 create an expandable manifold. First threaded pressure source port 76 receives input adapter 63, and the last threaded pressure source port 76 receives threaded end plug 65. Threaded pressure source ports 76 allow high-pressure fluid path for multiple flanged valve body assembly 60 paths creating a manifold of varying size and count. Stacked flanged valve body assemblies 60 create a manifold of any reasonable length, allowing the possibility to add or reduce a number of zone expander solenoid valve assemblies 20 at any time.

Present invention 10 assures adding zone expander solenoid valve assemblies 20 can take place by only removing threaded end plug 65, adding desired number of additional zone expander solenoid valve assemblies 20 with respective wiring, then re-applying threaded end plug 65 to the end of the run.

Each zone expander solenoid 40 is addressable and discoverable, whereby during a discovery process, sequence controller assembly 80, seen in FIG. 1, locates a first zone expander solenoid 40 unique identifier and addresses while noting its position, adding one it to a running total, and sequence controller assembly 80 discovers the unique identifier of first device, addresses it, stores its position, and adds it to a count (running total). Before discovering to next in line (series) to repeat process till discovery ends, Then starting the run of each zone expander solenoid 40 sequentially until pressure source ends presumably after the last zone expander solenoid 40 is operated. In a preferred embodiment, there are at least two zone expander solenoid valve assemblies 20, and up to 200. In another preferred embodiment, one may be added unlimited number of zone expander solenoid valve assemblies 20.

By the arrangement of alternating threaded bolt holes 68 and unthreaded bolt holes 70, there is assured proper offset. Threaded bolt holes 68 and unthreaded bolt holes 70 stagger and registration is assured by varying the bolt hole post height/length. Staggering allows stacking flanged valve body assemblies 60 in a manner that utilizes less width than the adjoining zone expander solenoids 40 itself. Alternating threaded bolt holes 68 and unthreaded bolt holes 70 allow offsetting zone expander solenoid 40, preventing contact and reducing material's thickness, as well as, reducing an amount of material required to manufacture flanged valve body assemblies 60, which reduce cost and weight.

As seen in FIGS. 6, 7A, 7B, and 7C, sequence controller assembly 80 comprises controller housing 90 having lid 92, battery cavity 94, controller cavity 96, and a plurality of holes 82. Sequence controller assembly 80 further comprises controller cavity seal 84, battery 86, and controller printed circuit board 88. Sequence controller assembly 80 further comprises fuse/fuse holder 98, pressure switch 100, input adapter 102, potting cavity 104, on/off switch 106, charge port 108, and power and data connections 110. Sequence controller assembly 80 auto-discovers interconnected zone expander solenoid 40, seen in FIG. 1, and configures a sequence accordingly. No manual configuration is required. Adding and reducing flanged valve body assemblies 60, seen in FIG. 2, requires no programming of sequence controller assembly 80, simply power cycle sequence controller assembly 80 and the count and address sequence will re-discover and assign sequences. Sequence controller assembly 80 only provides power to all zone expander solenoids 40 during the times of discovery, counting, and sequencing, and while present invention 10 is in use.

Present invention 10 meant to be supplied and controlled by a pressure source. In a preferred embodiment, the pressure source is a misting system. The number of zone expander solenoid valve assemblies 20, seen in FIG. 1, determines the number of zones that can be used to the pressure source's zoning ability, i.e. number of cycles.

Sequence controller assembly 80 puts timing and duration in a single location of the pressure source. Sequence controller assembly 80 monitors a pressure source output, such as, but not limited to, mosquito misters, detecting the rise and fall in its output line pressure, using it to startup and hold for the run duration by activating the first zone expander solenoid valve assemblies 20 on pressure rise, with each subsequent interruption in pressure sequence controller assembly 80 de-energizes the active zone expander solenoid valve assemblies 20 on pressure fall and sequences to the next zone expander solenoid valve assembly 20 and so-on. This makes the start and run time a function of the pressure source (mister or other) and sequence controller assembly 80 is a follower. Each zone expander solenoid 40 is discoverable and addressable-upon-discovery and controls its dataport downstream and valve actuation.

Present invention 10 directs output pressures to one zone at a time with minimal restrictions allowing each subsequent zone to be able to operate at very near full output capacity of the pressure source. While not in use, zone expander solenoid valve assemblies 20 remain unpowered to prevent electrolysis, quiescent current drain, and possibility of short circuits.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An expandable solenoid system, comprising:
   A) at least two zone expander solenoid valve assemblies assembled in a staggered configuration, wherein each of said zone expander solenoid valve assembly comprises a zone expander solenoid and a flanged valve body assembly, said zone expander solenoid valve assembly further comprises a pressure input source, a tee sample connector, a pressure sampling tube, and a pressure source tube; and
   B) a sequence controller assembly, said sequence controller assembly further comprises a controller cavity seal, a fuse/fuse holder, a pressure switch, an input adapter, a potting cavity, an on/off switch, a charge port, power and data connections, electrical wirings, and parallel power connections.

2. The expandable solenoid system set forth in claim 1, wherein said zone expander solenoid comprises a housing having a top wall, a base, and a solenoid wire cover.

3. The expandable solenoid system set forth in claim 2, wherein said housing houses a plunger, winding coils, and a serial data and solenoid controller.

4. The expandable solenoid system set forth in claim 2, wherein from said top wall extends power connections, series serial data connections, and a retainer nut, and from said base extends a joining port.

5. The expandable solenoid system set forth in claim 4, wherein said flanged valve body assembly comprises a valve block with a threaded block neck.

6. The expandable solenoid system set forth in claim 5, wherein said flanged valve body assembly further comprises an output adapter, O-rings, and flange bolts.

7. The expandable solenoid system set forth in claim 6, wherein said valve block comprises threaded bolt holes, unthreaded bolt holes, an output port, and a threaded pressure source port having an O-ring groove.

8. The expandable solenoid system set forth in claim 5, wherein said threaded block neck comprises internal threads, a pressure port conduit, and a valve seat.

9. The expandable solenoid system set forth in claim 7, wherein said threaded bolt holes and said unthreaded bolt holes comprises different depths and are alternately positioned.

10. The expandable solenoid system set forth in claim 7, wherein said threaded bolt holes and said unthreaded bolt holes are alternately positioned around a perimeter of said valve block and said threaded pressure source port and said output port are both at different distances from a center plane.

11. The expandable solenoid system set forth in claim 7, wherein a first said flanged valve body assembly is joined to a second said flanged valve body assembly, whereby a first of said threaded pressure source port is joined to a second of said threaded pressure source port.

12. The expandable solenoid system set forth in claim 11, wherein said first threaded pressure source port and said second threaded pressure source port are sealed by one of said O-ring, whereby said O-ring groove receives said O-ring.

13. The expandable solenoid system set forth in claim 11, wherein said first threaded pressure source port receives an input adapter and a last of said threaded pressure source port receives a threaded end plug.

14. The expandable solenoid system set forth in claim 7, wherein said valve block comprises a conduit and an output conduit from said output port to said threaded block neck, said threaded block neck receives said joining port.

15. The expandable solenoid system set forth in claim 1, wherein said sequence controller assembly comprises a controller housing defining a battery cavity and a controller cavity, a lid, and a plurality of holes, said controller housing houses a battery and a controller printed circuit board.

16. The expandable solenoid system set forth in claim 1, wherein said pressure sampling tube is connected from said input adapter to said tee sample connector, and said tee sample connector connects said pressure input source and said pressure source tube.

17. The expandable solenoid system set forth in claim 11, wherein said first flanged valve body assembly is fastened to said second flanged valve body assembly in a staggered configuration, whereby respective of said zone expander solenoids are in a zigzag geometry.

18. The expandable solenoid system set forth in claim 17, wherein said first flanged valve body assembly is fastened to said second flanged valve body assembly in a staggered configuration creating an expandable manifold.

* * * * *